United States Patent
Nakano (10) Patent No.: US 6,906,761 B2
(45) Date of Patent: Jun. 14, 2005

(54) REFLECTION SHEET AND BACKLIGHT UNIT USING THE SAME

(75) Inventor: Shoji Nakano, Hidaka-gun (JP)

(73) Assignee: Keiwa Inc., Osaka (JP)

( * ) Notice: Subject to any disclaimer, the term of this patent is extended or adjusted under 35 U.S.C. 154(b) by 0 days.

(21) Appl. No.: 10/243,327

(22) Filed: Sep. 12, 2002

(65) Prior Publication Data

US 2003/0053008 A1 Mar. 20, 2003

(30) Foreign Application Priority Data

Sep. 19, 2001 (JP) .................................... 2001-284309
Aug. 22, 2002 (JP) .................................... 2002-242725

(51) Int. Cl.$^7$ .......................................... G02F 1/1335
(52) U.S. Cl. ........................ 349/65; 349/61; 385/120; 385/147; 385/901; 362/31
(58) Field of Search .................. 349/65, 61; 385/120, 385/147, 901; 362/31

(56) References Cited

U.S. PATENT DOCUMENTS

| 5,138,472 | A | | 8/1992 | Jones et al. |
| 5,991,080 | A | | 11/1999 | Kohta et al. |
| 6,011,601 | A | | 1/2000 | Kojima |
| 6,163,350 | A | | 12/2000 | Ihara |
| 6,425,673 | B1 | * | 7/2002 | Suga et al. ................ 362/31 |
| 6,580,478 | B2 | * | 6/2003 | Kim ............................ 349/65 |
| 6,602,596 | B2 | | 8/2003 | Kimura et al. |
| 6,613,599 | B2 | | 9/2003 | Imaeda |

FOREIGN PATENT DOCUMENTS

| JP | 08-262208 | 10/1996 |
| JP | 11-316307 | 11/1999 |
| JP | 2000-122056 | 4/2000 |
| JP | 2001-166115 | 6/2001 |
| JP | 2001-166295 | 6/2001 |
| KR | 010047842 | 6/2001 |
| WO | WO 97/08252 | * 3/1997 ............ G02B/5/02 |

OTHER PUBLICATIONS

Rubber, Organic Chemistry, The Columbia Electronic Encyclopedia 2003, Columbia University Press.*
U.S. Appl. No. 10/243,365, filed Sep. 12, 2002, Nakano.

* cited by examiner

Primary Examiner—Robert H. Kim
Assistant Examiner—Prasad R. Akkapeddi
(74) Attorney, Agent, or Firm—Jordan and Hamburg LLP (57) ABSTRACT

A reflection sheet which can prevent scratches on a back face of an optical waveguide plate, and a backlight unit capable of attempting the improvement of brightness and the uniformization of the brightness using the reflection sheet. The reflection sheet includes a substrate sheet made of a white synthetic resin and a scratchproof layer overlaid to the front face side of this substrate sheet, wherein the scratchproof layer has flexible protrusions on its front face in a substantially uniform manner. The scratchproof layer includes a binder and beads dispersed in the binder. Flexible elastomer material which constitutes the beads is preferably flexible polyurethane or a silicone rubber.

13 Claims, 3 Drawing Sheets

REFLECTION SHEET AND BACKLIGHT UNIT USING THE SAME

BACKGROUND OF THE INVENTION

1. Field of the Invention

The present invention relates to reflection sheets for a backlight unit which reduce loss of rays of light, and backlight units in which this reflection sheet is used.

2. Description of the Related Art

Figure 5:
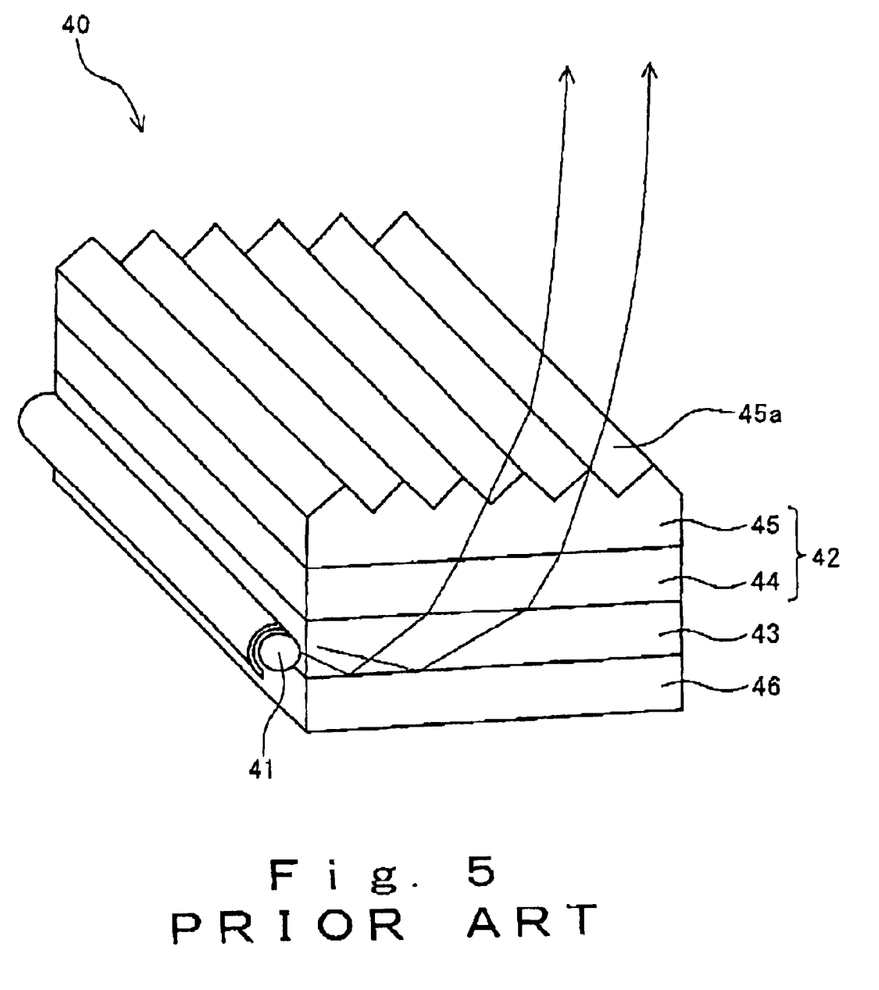
FIG. 5 depicts a schematic perspective view illustrating a common backlight unit of an edge light type.

Liquid crystal equipments in widespread use have been in a backlight system where light emission is executed by irradiating onto a liquid crystal layer from the back face. In such a type of equipment, a backlight unit which is an edge light type, an immediate beneath type or the like is provided to an under face side of the liquid crystal layer. Such a backlight unit 40 of an edge light type is generally equipped with a rod-shaped lamp 41 for use as a light source, an optical waveguide plate 43 having a square plate shape disposed so that the edge thereof abuts along the lamp 41, multiple optical sheets 42 overlaid to the front face side of the optical waveguide plate 43, and a reflection sheet 46 overlaid to the back face side of the waveguide plate 43, as shown in FIG. 5. Each of the optical sheets 42 has specified optical properties such as refraction, diffusion and the like. Specifically, included are a light diffusion sheet 44 provided on the front face side of the optical waveguide plate 43, a prism sheet 45 provided on the front face side of the light diffusion sheet 44, and the like.

Referring to functions of the backlight unit 40, rays of incident light from the lamp 41 to the optical waveguide plate 43 are first reflected on reflection dots (not shown in the Figure) of the back face of the waveguide plate 43 and on each of the side faces, and exit from the front face of the waveguide plate 43. The rays of light that exited from the waveguide plate 43 enter into the light diffusion sheet 44, then diffuse and exit from the front face of the light diffusion sheet 44. Thereafter, the rays of light exited from the light diffusion sheet 44 enter into a prism sheet 45, and exit as rays having a distribution representing a peak in a direction along a substantially normal line through a prism part 45a formed on the front face of the prism sheet 45. Accordingly, the rays of light exited from the lamp 41 are diffused by the light diffusion sheet 44, while being refracted by the prism sheet 45 so that they represent a peak in a direction along the substantially normal line, and illuminate the entire face of the upper liquid crystal layer although not shown in the Figure.

Meanwhile, a reflection sheet 46 is provided to the back face side of the optical waveguide plate 43 for the purpose of: attempting the improvement of brightness through reflecting rays of light that are radiated from the back face of the optical waveguide plate 43 to the front face side in an extent that glare does not result thereby (reflection property); and preventing instruments, frames and the like that are provided to the back face side of the backlight unit 40 from becoming visible (concealing property).

Examples of such a reflection sheet 46 which may be conventionally used include: (a) sheets made of a synthetic resin including a white pigment such as titanium oxide dispersed therein; (b) sheets made of a synthetic resin including voids (bubbles) dispersed therein for light scattering; (c) sheets having a surface formed into a mat state; and the like.

Because the conventional reflection sheets 46 as described above are comparatively hard, back face of the optical waveguide plate 43 overlaid to the front face side in the backlight unit 40 may get scratched. Particularly, in instances of the optical waveguide plate 43 having a prism part with a gentle tilt to the back face and imparting directional characteristics toward the normal line to rays of light that exited; or comparatively flexible optical waveguide plate 43 made of amorphous olefin resin (for example, "Zeonor optical waveguide plate" manufactured by Nihon Zeon Corporation), there is relatively great possibility to cause scratches onto the back face of the reflection sheet 46. Scratching on a back face of the optical waveguide plate 43 in this manner results in decrease in the amount of light exited to the front face side, and lack in uniformity of the brightness.

SUMMARY OF THE INVENTION

The present invention was accomplished taking into account of such disadvantages, and objects of the present invention are: to provide a reflection sheet capable of preventing an overlaid face such as a back face of an optical waveguide plate from getting scratched; and to provide a backlight unit capable of attempting the improvement of brightness and the uniformization of the brightness using said reflection sheet.

The present invention which was accomplished to solve the problems described above is a reflection sheet for a backlight unit which reduces loss of rays of light, comprising a substrate sheet made of a white synthetic resin, and a scratchproof layer overlaid to the front face side of the substrate sheet, wherein this scratchproof layer has plural flexible protrusions on its front face in a substantially uniform manner. The term "white synthetic resin" herein means a synthetic resin that exhibits white color through blending a white pigment or dispersing minute bubbles.

This reflection sheet achieves comparable reflection property and concealing property to those of conventional reflection sheets by employing a substrate sheet made of a white synthetic resin. In addition, this reflection sheet contacts in a scattering fashion at plural flexible protrusions on the front face of the scratchproof layer, with an optical waveguide plate disposed through overlaying to the front face side of the reflection sheet in a backlight unit. Consequently, in accordance with this reflection sheet, possible scratching of the back face of an optical waveguide plate can be markedly reduced, and in addition, sticking between the reflection sheet and the optical waveguide plate can be prevented. Furthermore, mutual scratching of the reflection sheet(s) can be prevented even though they are in friction each other by rolling or lapping upon preservation, transport or the like of the reflection sheet.

Surface roughness (Ra) of the scratchproof layer described above preferably ranges from 5 μm to 20 μm. The term "surface roughness (Ra)" herein refers to a value measured with a cutoff value of 8 mm, and an evaluation length of 40 mm. By setting the surface roughness (Ra) of the scratchproof layer having plural flexible protrusions on its front face in the range described above, a mode of contact with the above-described optical waveguide plate can be made into contact at a number of points by means of protrusions dispersed in a substantially uniform manner. Thus, scratchproof property toward the optical waveguide plate described above can be promoted.

Suitable scratchproof layer includes a binder and beads made of a flexible elastomer material dispersed in this binder. By means of these beads, the protrusions described above can be formed. A scratchproof layer having such a structure can be readily formed without fail to include the above-described plural flexible protrusions on the front face thereof by the beads made of a flexible elastomer material dispersed in the binder.

Glass transition temperature of the flexible elastomer material constituting the beads described above preferably ranges from −100° C. to 30° C. By thus defining the glass transition temperature of the flexible elastomer material constituting the beads in the range described above, hardness of the protrusions can be decreased insofar as contact of the beads with the optical waveguide plate in a scattering fashion can be retained, and scratchproof property toward the back face of an optical waveguide plate can be thereby promoted.

Examples of a preferable material that constitutes the beads described above include flexible polyurethane or a silicone rubber. These materials are comparatively flexible, which can readily form the above-described plural flexible protrusions without fail, and thus scratching of the back face of an optical waveguide plate can be markedly decreased.

The above beads which may be used include those having a two-layered structure comprising a spherical core part made of a silicone rubber, and a silicone resin layer covering over the surface of this spherical core part. By using beads having a two-layered structure with a silicone resin layer covering over the outer face of a flexible spherical core part made of a silicone rubber, scratchproof action by the flexible beads can be achieved as described above. In addition, stability in a polymer composition constituting the binder is improved accordingly, for example, elution of silicone oil and the like from the beads can be reduced.

Mean particle size of the above beads (average primary particle diameter) is preferably from 1 $\mu$m to 40 $\mu$m. By using the beads having mean particle size in such a range, surface roughness (Ra) of a scratchproof layer can be controlled to give the range as described above, and thus scratchproof property and sticking-preventive property can be efficiently achieved.

Pencil hardness of the binder described above preferably ranges from 6B to B. By making the pencil hardness of the binder in the above range, and thus making the binder of the scratchproof layer flexible, the flexible beads can be covered with a flexible binder. Accordingly, the protrusions formed on the front face of the reflection sheet can be further made more flexible. As a consequence, external force acting on the front face of the reflection sheet can be flexibly absorbed, and scratchproof property described above can be further promoted.

The binder as described above may be formed from a polymer composition containing polyester polyol. By using polyester polyol as a substrate polymer for the polymer composition constituting the binder in accordance with such a means, the binder can be flexibilized to enable the pencil hardness be controlled within the range described above. Consequently, the scratchproof property as described above can be efficiently promoted.

Polyisocyanate may be contained as a curing agent in the above polymer composition. By thus blending polyisocyanate as a curing agent in the polymer composition which forms the binder, velocity of the curing reaction of the polymer composition can be accelerated to result in the improvement of productivity. Therefore, even if a cationic antistatic agent is blended into the polymer composition, deterioration of velocity of the curing reaction due to the addition of such a cationic antistatic agent can be sufficiently compensated.

The amount of the above-described beads to be blended per 100 parts by weight of polymer content of the binder is preferably from 0.1 parts by weight to 100 parts by weight. By setting the amount of the beads to be blended in the range described above, scratchproof property and sticking-preventive property as described above can be efficiently imparted to a reflection sheet.

As an alternative scratchproof layer as described above, those having a structure including a substrate polymer and bubbles dispersed in this substrate polymer may be available. These bubbles can form the protrusions as described above. By making the scratchproof layer to have such a structure including bubbles dispersed in a substrate polymer as this means, minute and plural protrusions can be formed on its front face. In addition, because gas exists within these protrusions, such protrusions formed on the surface of the scratchproof layer can be readily flexible without fail. Consequently, scratchproof property toward an optical waveguide plate can be accomplished.

Mean size (diameter) of the bubbles described above preferably ranges from 0.5 $\mu$m to 50 $\mu$m. By setting mean size of the bubbles dispersed in the scratchproof layer within the range described above, surface roughness (Ra) of the scratchproof layer can be controlled to fall within the range as described above, and thus the scratchproof property can be efficiently achieved.

Volume ratio of the above bubbles to the substrate polymer is preferably from 1 vol % to 80 vol %. By setting the volume ratio of the bubbles within the range described above, hardness of the protrusions that contact with the back face of the optical waveguide plate can be reduced to an extent to allow contact in a scattering fashion, and thus the scratchproof property toward the back face of an optical waveguide plate as described above can be promoted.

In this reflection sheet, a highly concealing layer may be further provided which is overlaid to the back face side of the substrate sheet described above. This highly concealing layer may be formed by coating a paint which contains a white pigment. According to this means, reflection property and concealing property of a substrate sheet can be markedly improved on behalf of the highly concealing layer overlaid to the back face side of the substrate layer.

Therefore the reflection sheet of the present invention described hereinabove may be used as a reflection sheet (d), in a backlight unit for use in a liquid crystal display device equipped with: (a) a lamp in a linear shape; (b) an optical waveguide plate which is provided so that it lays along this lamp, and which guides rays of light emitted from the lamp to the front face side; (c) one or more optical sheets which are provided to the front face side of this optical waveguide plate, and which diffuse the rays of light that exited from the above optical waveguide plate in a substantially uniform manner and refract them to a direction of the normal line; and (d) a reflection sheet provided to the back face side of the optical waveguide plate, which reduces loss of rays of light. In this backlight unit, a back face of the optical waveguide plate can be prevented from getting scratched, thus decrease in brightness and occurrence of lack in uniformity of the brightness resulting from scratches on the back face of the optical waveguide plate can be prevented, because high scratchproof property is achieved by the reflection sheet as described above. In addition, working property in e.g., assembly thereof is also satisfactory.

DESCRIPTION OF THE PREFERRED EMBODIMENTS

Embodiments of the present invention are described an detail below with reference to the figures ad libitum.

Figure 1:
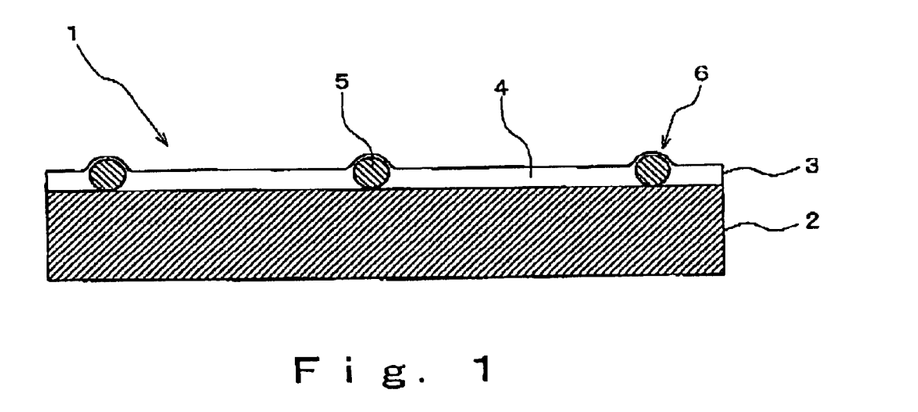
FIG. 1 depicts a schematic cross sectional view illustrating a reflection sheet according to one embodiment of the present invention.

A reflection sheet 1 in FIG. 1 includes a substrate sheet 2, and a scratchproof layer 3 overlaid on the front face of this substrate sheet 2.

The substrate sheet 2 is formed from a white synthetic resin. This white synthetic resin is a synthetic resin containing a white pigment or minute bubbles dispersed therein as described above. Synthetic resin which can be used for this substrate sheet 2 is not particularly limited, however, included are for example, polyethylene terephthalate, polyethylene naphthalate, acrylic resin, polycarbonate, polystyrene, polyolefin, cellulose acetate, weather resistant vinyl chloride, and the like. Among them, polyethylene terephthalate having an excellent heat resistance is preferred.

Although thickness of the substrate sheet 2 is not particularly limited, it may be for example, equal to or greater than 50 $\mu$m and equal to or less than 250 $\mu$m. When the thickness of the substrate sheet 2 is less then the above range, curling is liable to occur upon coating of the resin composition for forming a scratchproof layer 3. To the contrary, when the thickness of the substrate sheet 2 is greater than the above range, brightness of a liquid crystal display device may be deteriorated, and thickness of a backlight unit becomes too large, which may result in adverse demand for thin modeling of a liquid crystal display device.

The white pigment is not particularly limited, however, included may be for example, titanium oxide (white titanium), zinc oxide (flower of zinc), lead carbonate (white lead), barium sulfate, calcium carbonate (whiting chalk) and the like. Among them, titanium oxide is preferred which exhibits a strong effect to improve the concealing property.

Average particle diameter of the white pigment is preferably equal to or greater than 100 nm and equal to or less than 30 $\mu$m, and particularly preferably equal to or greater than 200 nm and equal to or less than 20 $\mu$m. When the average particle diameter of the white pigment is below the range described above, sufficient reflection property and concealing property may not be imparted to a reflection sheet 1. To the contrary, when the average particle diameter of the white pigment is above the range described above, reflection property and concealing property of the reflection sheet 1 may lack uniformity.

With respect to bubbles dispersed and contained therein, their content and average diameter may also be optionally adjusted so that reflection property and concealing property can be provided similarly to conventional reflection sheets.

The scratchproof layer 3 includes a binder 4 overlaid to give a thin layer, and beads 5 dispersed in this binder 4. These beads 5 are dispersed in the binder 4 spacing apart with each other. Therefore, to the front face of the reflection sheet 1 (in other words, the front face of the scratchproof layer 3), there are formed plural protrusions 6 that are smoothly curved owing to the presence of the beads. Accordingly, when this reflection sheet 1 is disposed to overlay the back face of the optical waveguide plate, these plural protrusions 6 are brought into contact with the back face of the optical waveguide plate in a scattering fashion, and thus it becomes impossible that the entire surface of the front face of the reflection sheet 1 is brought into contact with the optical waveguide plate. Sticking between the reflection sheet 1 and the optical waveguide plate is thereby prevented, leading to suppression of the lack in uniformity of the brightness of the window of a liquid crystal display device. Thickness of the scratchproof layer 3 (thickness of the binder 4 part, excluding beads 5) is not particularly limited, however for example, it may be equal to or greater than 1 $\mu$m and equal to or less than 10 $\mu$m.

Lower limit of surface roughness (Ra) of the scratchproof layer 3 is preferably 5 $\mu$m, particularly preferably 7 $\mu$m, and more preferably 9 $\mu$m, whilst the upper limit thereof is preferably 20 $\mu$m, particularly 17 $\mu$m, and more preferably 14 $\mu$m. When the surface roughness (Ra) of the scratchproof layer 3 is less than the above lower limit, it becomes difficult to efficiently achieve the scratchproof property through scattering contact with the back face of an optical waveguide plate. To the contrary, when the surface roughness (Ra) of the scratchproof layer 3 is greater than the above upper limit, rough protrusions 6 may adversely scratch the back face of the optical waveguide plate.

Beads 5 are formed from a flexible elastomer material. By using the beads 5 made of such a flexible elastomer material, hardness of the protrusions 6 formed on the front face of the scratchproof layer 3 described above is decreased, thereby achieving scratchproof property toward the back face of the optical waveguide plate described above.

Specific lower limit of the glass transition temperature of this flexible elastomer material is preferably −100° C., particularly preferably −80° C., and more preferably −60° C., whilst the upper limit thereof is preferably 30° C., particularly preferably 25° C., and more preferably 20° C. When the glass transition temperature of the flexible elastomer material that constitutes the beads 5 is greater than the above upper limit, hardness of the protrusions 6 on the front face of the reflection sheet 1 is elevated, resulting in inefficiently achieved scratchproof property toward the back face of the above-described optical waveguide plate. When the glass transition temperature of the flexible elastomer material is less than the above lower limit, the protrusions 6 of the front face of the reflection sheet 1 may be collapsed to bring the front face of the binder 4 into contact with the back face of an optical waveguide plate, and thus it becomes thereby impossible to efficiently achieve the scratchproof property.

Specific flexible elastomer materials which can be used for the beads 5 include for example, polyurethane, a silicone rubber, polystyrene, thermoplastic polyester and the like. Among them, flexible polyurethane or a silicone rubber is preferred because plural flexible protrusions 6 are readily formed without fail.

This silicone rubber is also referred to as a silicon rubber in general, which is a synthetic rubber of which main chain consists of an organosiloxane bond —(SiR$^2$O)n—. The group R may be generally a methyl group, however, included may be those having substituted vinyl group(s) in part for facilitating the crosslinking, and phenyl groups, groups having various substituents such as fluorinated alkyl groups, as long as the silicone rubber serves as an elastic body at ambient temperatures. Beads 5 consisting of such a silicone rubber is flexible, therefore, protrusions 6 on the front face of the reflection sheet 1 formed by indwelling beads 5 also become flexible. Accordingly, in a backlight unit, the reflection sheet 1 contacts in a scattering fashion at the protrusions 6 with the optical waveguide plate disposed by overlaying thereon. Thus, scratches of the front face of an optical waveguide plate can be markedly decreased. Beads 5 which may be used include those subjected to surface treatment with a coupling agent.

Shape of the beads 5 is not particularly limited, as long as comparatively smooth protrusions 6 are formed on the front face of the scratchproof layer 3, having scratchproof property as described above. For example, the shape may be spherical, spheroidal, spindle, fibrous and the like, and particularly preferably spherical that is excellent in scratchproof property.

Lower limit of the average diameter of the beads 5 is preferably 1 µm, particularly preferably 3 µm, and more preferably 5 µm, whilst the upper limit thereof is preferably 40 µm, particularly preferably 30 µm, and more preferably 20 µm. When the average diameter of the beads 5 is less than the above lower limit, it becomes difficult to form the protrusions 6 on the front face of the scratchproof layer 3 with the beads 5. To the contrary, when the average diameter of the beads 5 is greater than the above upper limit, height of the protrusions 6 formed on the front face of the reflection sheet 1 increases, and the back face of the optical waveguide plate may be thereby scratched.

Beads 5 are preferably transparent, in particular, clear and colorless. By using such transparent beads accordingly, deterioration in uniformization of the reflection property and concealing property of the reflection sheet 1 can be suppressed.

Lower limit of the amount of the beads 5 per 100 parts by weight of polymer content of the binder 4 (polymer content in the polymer composition described below) is preferably 0.1 parts by weight, particularly preferably 1 part by weight, and more particularly, 5 parts by weight is preferred, whilst upper limit thereof is preferably 100 parts by weight, particularly preferably 20 parts by weight, and more particularly, 15 parts by weight is preferred. By setting the amount of the beads 5 to be in the range described above, which is comparatively small, scratchproof property and sticking preventive property as described above can be efficiently prevented, Binder 4 can be formed by curing (crosslinking or the like) a polymer composition containing a substrate polymer, and the beads 5 are disposed and fixed at substantially equal density to the entire surface of the front face of the substrate sheet 2. To the polymer composition for forming the binder 4, for example, minute inorganic fillers, curing agents, plasticizers, dispersants, various leveling agents, antistatic agents, ultraviolet absorbers, anti-oxidizing agents, viscosity modifying agents, lubricants, light stabilizers and the like may be optionally blended in addition to the polymer.

Pencil hardness of the binder 4 is preferably from 6B to B, particularly from 6B to 4B, and more particularly, 5B is preferred. Lower limit of the glass transition temperature of the binder 4 is preferably 30° C., and particularly preferably 40° C., while the upper limit thereof is preferably 75° C., and particularly preferably 70° C. By adjusting the pencil hardness and glass transition temperature of the binder 4 in such a manner to be in the range described above, flexible beads 5 made of a silicone rubber are covered with the flexible binder 4. Therefore, external pressure acting upon the front face of the reflection sheet 1 (in particular, protrusions 6) is flexibly absorbed, and thus possible scratching of the optical waveguide plate disposed by overlaying on the front face of the reflection sheet 1 can be further reduced in a backlight unit.

The substrate polymer described above is not particularly limited, and examples thereof include acrylic resin, polyurethane, polyester, fluorocarbon resin, silicone resin, polyamide imide, epoxy resin, ultraviolet curing resin and the like. These polymers may be used alone or as a mixture of two or more thereof. In particular, it is preferred that the substrate polymer described above is polyol which is excellent in processing characteristics, and capable of readily forming the scratchproof layer 3 with a means such as coating or the like. The substrate polymer for use in the binder 4 is preferably transparent which does not affect on the reflection property and concealing property of the substrate sheet 2. Clear and colorless polymer is particularly preferred.

Examples of polyol described above include polyol that is obtained by polymerization of a monomer component comprising hydroxyl group-containing unsaturated monomers, polyester polyol obtained under a condition in which hydroxyl groups are present in excess. These monomers may be used alone or as a mixture of two or more thereof.

This hydroxyl group-containing unsaturated monomer may include (a) hydroxyl group-containing unsaturated monomers such as for example, 2-hydroxyethyl acrylate, 2-hydroxypropyl acrylate, 2-hydroxyethyl methacrylate, 2-hydroxyprophyl methacrylate, allyl alcohol, homo allyl alcohol, cinnamyl alcohol, crotonyl alcohol or the like, (b) hydroxyl group-containing unsaturated monomers obtained by the reaction of dihydric alcohol or an epoxy compound such as for example, ethyleneglycol, ethylene oxide, propylene glycol, propylene oxide, butylene glycol, butylene oxide, 1,4-bis(hydroxymethyl)cyclohexane, phenylglycydyl ether, glycydyldecanoate, PLACCEL FM-1 (Daicel Chemical Industries, Ltd.), with an unsaturated carboxylic acid such as for example, acrylic acid, methacrylic acid, maleic acid, fumaric acid, crotonic acid, itaconic acid or the like. Polyol can be produced by polymerizing one or more these hydroxyl group-containing unsaturated monomers that are selected among these.

Further, polyol can be also produced by polymerizing a hydroxyl group-containing unsaturated monomer selected from the above (a) and (b), with one or more unsaturated ethylene monomer(s) selected from ethyl acrylate, n-propyl acrylate, isopropyl acrylate, n-butyl acrylate, tert-butyl acrylate, ethylhexyl acrylate, ethyl methacrylate, n-propyl methacrylate, isopropyl methacrylate, n-butyl methacrylate, tert-butyl methacrylate, ethylhexyl methacrylate, glycydyl methacrylate, cyclohexyl methacrylate, styrene, vinyltoluene, 1-methylstyrene, acrylic acid, methacrylic acid, acrylonitrile, vinyl acetate, vinyl propionate, vinyl stearate, allyl acetate, diallyl adipate, diallyl itaconate, diethyl maleate, vinyl chloride, vinylidene chloride, acrylamide, N-methylolacrylamide, N-butoxymethylacrylamide, diacetoneacrylamide, ethylene, propylene, isoprene and the like.

Number average molecular weight of such polyol as obtained by polymerization of a hydroxyl group-containing unsaturated monomer ranges from 1000 to 500000, and preferably from 5000 to 100000. Moreover, hydroxyl value thereof is from 5 to 300, preferably from 10 to 200, and more preferably from 20 to 150.

Polyester polyol obtained under a condition in which hydroxyl groups are present in excess can be produced by the reaction of (c) polyhydric alcohol such as for example, ethyleneglycol, diethyleneglycol, propyleneglycol, dipropyleneglycol, 1,3-butanediol., 1,4-butanediol, 1,5-pentanediol, neopentylglycol, hexamethyleneglycol, decamethyleneglycol, 2,2,4-trimethyl-1,3-pentanediol, trimethylol propane, hexanetriol, glycerol, pentaerythritol, cyclohexanediol, hydrogenated bisphenol A, bis(hydroxymethyl)cyclohexane, hydroquinonebis (hydroxymethyl ether), tris(hydroxyethyl) isocyanurate, xyleneglycol or the like with (d) a polybasic acid such as for example, maleic acid, fumaric acid, succinic acid, adipic acid, sebacic acid, azelaic acid, trimellitic acid, terephthalic acid, phthalic acid, isophthalic acid or the like, under a condition in which hydroxyl value of the polyhydric alcohol such as propanediol, hexanediol, polyethyleneglycol, trimethylol propane or the like is greater than carboxyl value of the above-described polybasic acid.

Number average molecular weight of polyester polyol obtained under such a condition in which hydroxyl groups are present in excess ranges from 500 to 300000, and preferably from 2000 to 100000. In addition, hydroxyl value thereof ranges from 5 to 300, preferably from 10 to 200, and more preferably from 20 to 150.

Polyol which may be used as a substrate polymer in the polymer composition is preferably polyester polyol described above. By using polyester polyol as a substrate polymer of the binder 4, the binder 4 is flexibilized, and pencil hardness and glass transition temperature can be reliably controlled to fall within the above range. Consequently, excellent scratchproof property toward the back face of the optical waveguide plate can be achieved. Additionally, the binder 4 comprising such polyester polyol as a substrate polymer exhibits high weather resistance, which can suppress yellow discoloration and the like of the scratchproof layer 3.

Number of the hydroxyl groups in the polyester polyol described above is not particularly limited as long as it is two or greater per one molecule, however, when hydroxyl value in the solid content is equal to or less than 10, crosslinking points are decreased, resulting in tendency to deterioration of properties of the coated layer such as solvent resistance, water resistance, heat resistance and the like.

It is preferred that the above-described substrate polymer be polyol having a cycloalkyl group. By introducing a cycloalkyl group into the substrate polymer (polyol) which constitutes the binder 4, hydrophobicity of the binder 4 such as water repellency, water resistance and the like may be elevated, thereby improving the anti bending property, dimensional stability and the like of the reflection sheet 1. Moreover, basic performance of the coating such as whether resistance, solvent resistance or the like is also improved. In addition, affinity with minute inorganic fillers described hereinafter, which are fixed with an organic polymer on their surfaces, and uniform dispersibility of the minute inorganic fillers become more satisfactory.

The cycloalkyl group described above is not particularly limited, however, examples thereof include a cyclobutyl group, a cyclopentyl group, a cyclohexyl group, a cycloheptyl group, a cyclooctyl group, a cyclononyl group, a cyclodecyl group, a cycloundecyl group, a cyclododecyl group, a cyclotridecyl group, a cyclotetradecyl group, a cyclopentadecyl group, a cyclohexadecyl group, a cycloheptadecyl group, a cyclooctadecyl group and the like.

Polyol having the cycloalkyl group described above can be obtained by copolymerization of a polymerizable unsaturated monomer having a cycloalkyl group. This polymerizable unsaturated monomer having a cycloalkyl group is a polymerizable unsaturated monomer having at least one cycloalkyl group within a molecule. This polymerizable unsaturated monomer is not particularly limited, but examples thereof include cyclohexyl(meth)acrylate, methylcyclohexyl(meth)acrylate, tert-butylcyclohexyl (meth)acrylate, cyclododecyl(meth) acrylate and the like.

When polyol is used as the substrate polymer as described above, a polyisocyanate compound may be contained as a curing agent into the above polymer composition. This polyisocyanate compound is a derivative such as dimmer, trimer, tetramer and the like prepared by polymerizing diisocyanate. By blending this polyisocyanate compound, velocity of the curing reaction of the polymer composition is increased. Therefore, even though a cationic antistatic agent which is responsible for dispersion stability of the minute inorganic filler is contained in the polymer composition, decrease in velocity of the curing reaction due to the cationic antistatic agent can be sufficiently compensated, and thus productivity can be enhanced.

Polyisocyanate compound described above is preferably a xylene diisocyanate derivative or an aliphatic diisocyanate derivative. In particular, xylene diisocyanate derivative alone or a mixture of the xylene diisocyanate derivative and the aliphatic diisocyanate derivative are preferred. This xylene diisocyanate derivative has great effects on improving the reaction velocity of the polymer composition, and exhibits comparatively low yellow discoloration and deterioration resulting from heat or ultraviolet light among aromatic diisocyanate derivatives. Therefore, it can reduce time dependent deterioration of light transmittance of the reflection sheet 1. To the contrary, although an aliphatic diisocyanate derivative has comparatively low effects on improving the reaction velocity in comparison with an aromatic diisocyanate derivative, it exhibits remarkably small yellow discoloration and deterioration resulting from ultraviolet light. Accordingly, by admixing with a xylene diisocyanate derivative, effects on improving the reaction velocity and preventive effects of yellow discoloration can be achieved in a well balanced manner.

Preferable aliphatic diisocyanate derivative includes isoholon diisocyanate derivatives and hexamethylene diisocyanate derivatives. Such isoholon diisocyanate derivatives and hexamethylene diisocyanate derivatives exhibit comparatively strong action on improving the curing reaction velocity among the aliphatic diisocyanate derivatives, thereby capable of promoting the productivity and heat resistance as described above.

Type of the diisocyanate derivative described above is preferably TMP adduct type, isocyanurate type or biuret type. In accordance with these types of derivatives, the curing reaction velocity as described above can be efficiently elevated.

Lower limit of the amount of the polyisocyanate compound to be blended (amount calculated on the basis of the solid content to 100 parts by weight of polymer content in the polymer composition) is preferably 2 parts by weight, and particularly preferably 5 parts by weight. On the other hand, upper limit of the above amount of the polyisocyanate compound is preferably 20 parts by weight, and particularly preferably 15 parts by weight. By setting the amount of the polyisocyanate compound to be blended in the range described above, the action on improving the curing reaction velocity of the polymer composition described above can be effectively achieved.

Moreover, a minute inorganic filler may be contained in the polymer composition described above. By being dispersed and contained the minute inorganic filler into the binder 4, heat resistance of the scratchproof layer 3 as well as the entire reflection sheet 1 can be remarkably elevated. Consequently, deformation of the reflection sheet 1 upon exposure to heat of a lamp or moisture in an atmosphere can be markedly suppressed.

Inorganic matter that constitutes the minute inorganic filler is not particularly limited, however, inorganic oxides are particularly preferred. The inorganic oxides are defined as various oxygen-containing metal compounds in which a metal element constructed a three dimensional network through binding predominantly with an oxygen atom. The metal element for constructing the inorganic oxides is for example, preferably an element selected from group II–VI in a periodic table of the elements, and more preferably an element selected from group III–V in a periodic table of the elements. Among these, an element selected from Si, Ar, Ti and Zr is particularly preferable. As the minute inorganic filler, colloidal silica in which the metal element is Si is most preferred. Further, shape of the minute inorganic filler may be an optional particle shape such as spherical, aciculate, plate-like, squamous, granular and the like, but not limited thereto.

Lower limit of the average diameter of the minute inorganic filler is preferably 5 nm, and particularly preferably 10 nm. On the other hand, upper limit of the average diameter of the minute inorganic filler is preferably 50 nm, and particularly preferably 25 nm. When the average diameter of the minute inorganic filler is less than the range described above, surface energy of the minute inorganic filler is elevated, and thus aggregation or the like becomes liable to occur. To the contrary, when the average diameter of the minute inorganic filler is greater than the range described above, scratchproof layer 3 becomes clouded under the influence of shorter wavelength, which may affect on the reflection property and concealing property of the reflection sheet 1.

Lower limit of the amount of the minute inorganic filler (only the inorganic component) to be blended (amount calculated on the basis of the solid content to 100 parts by weight of polymer content in the polymer composition) is preferably 10 parts by weight, and particularly preferably 50 parts by weight. On the other hand, upper limit of the above amount of the minute inorganic filler is preferably 500 parts by weight, and particularly preferably 200 parts by weight. When the amount of the minute inorganic filler to be blended is less than the range described above, heat resistance of the reflection sheet 1 may not be sufficiently exhibited. To the contrary, when the amount to be blended is greater than the range described above, blending the inorganic filler into the polymer composition may be difficult, and scratchproof property of the scratchproof layer 3 may be deteriorated.

The minute inorganic filler which may be used includes a filler whose surface has an organic polymer fixed thereon. By thus using a minute inorganic filler fixed with an organic polymer, improvement can be attempted for dispersion property in the binder 4 and for affinity with the binder 4. In regard to this organic polymer, molecular weight, shape, constitution, presence or absence of the functional group, and the like are not particularly limited, but any optional organic polymer can be used. In addition, the organic polymer which can be used may be in an optional shape such as linear, branched, crosslinked or the like.

Specific examples of the resin that constitutes the organic polymer include (meth)acryl resin, polystyrene, vinyl polyacetate, polyolefin such as polyethylene, polypropylene and the like, polyesters such as polyvinyl chloride, polyvinylidene chloride, polyethylene terephthalate and the like, and copolymers thereof, and partially modified resins thereof with a functional group such as an amino group, an epoxy group, a hydroxyl group, a carboxyl group or the like. Among these, resins comprising an organic polymer including a (meth)acryl unit as an essential ingredient, such as (meth)acryic resin, (meth)acryl-styrene resin, (meth)acryl-polyester resin are suitable because they have potency to form a film. On the other hand, resins having compatibility with the substrate polymer of the polymer composition described above is preferred. Accordingly, the most preferred is a resin having the same constitution with the substrate polymer that is contained in the polymer composition.

Minute inorganic filler may include an organic polymer within a fine particle. Appropriate softness and toughness can be thereby imparted to an organic matter that becomes a core of the minute inorganic filler.

An organic polymer having an alkoxy group may be used as the above organic polymer. Content thereof is preferably from 0.01 mmol to 50 mmol per 1 g of the minute inorganic filler fixed with an organic polymer. Such an alkoxy group can result in enhanced affinity with a matrix resin that constitutes the binder 4, or improved dispersion property in the binder 4.

Alkoxy group herein implies an RO group bound to a metal element forming a minute particle skeleton. This R represents an alkyl which may be substituted, and the RO groups in the fine particles may be either identical or different. Specific examples of R include methyl, ethyl, n-propyl, isopropyl, n-butyl and the like. It is preferred that metal alkoxy group having a metal that is identical with the metal which is constituting the minute inorganic filler is used. When the minute inorganic filler is colloidal silica, an alkoxy group in which silicon is included as a metal is preferred.

Although percentage content of the organic polymer in the minute inorganic filler that is fixed with an organic polymer is not particularly limited, the content thereof is preferably equal to or greater than 0.5% by weight and equal to or less than 50% by weight.

It is preferred that an organic polymer having a hydroxyl group is used as the organic polymer to be fixed on the minute inorganic filler, and that at least one selected from; a polyfunctional isocyanate compound having two or more functional groups that react with a hydroxyl group; a melamine compound; and an aminoplast resin is contained in the polymer composition constituting the binder 4. Accordingly, the minute inorganic filler and the matrix resin of the binder 4 are bound via a crosslinking structure, leading to excellent stability upon preservation, stain resistance, flexibility, weather resistance and the like. Furthermore, the resulting film can be glossy.

The polyfunctional isocyanate compound described above may include: aliphatic, alicyclic, aromatic and other polyfunctional isocyanate compounds, and modified compounds of the same. Specific examples of the polyfunctional isocyanate compound include for example, trimers such as biuret body or isocyanurate body and the like of tolylene diisocyanate, xylylene diisoyanate, diphenylmethane diisocyanate, hexamethylene diisocyanate, isoholon diisocyanate, lysine diisocyanate, 2,2,4-trimethylhexylmethane diisocyanate, methylcyclohexane diisocyanate, 1,6-hexylmethane diisocyanate; compounds having two or more remaining isocyanate groups produced by reaction of these polyfunctional isocyanates with polyhydric alcohol such as propanediol, hexanediol, polyethyleneglycol, trimethylol propane or the like; blocked polyfunctional isocyanate compounds prepared by blocking these polyfunctional isocyanate compounds with a blocking agent e.g., alcohols such as ethanol, hexanol and the like, compounds having a phenolic hydroxyl group such as phenol, cresol and the like, oximes such as acetoxime, methylethylketoxime and the like, lactams such as ε-caprolactam, γ-caprolactam and the like; and the like. The polyfunctional isocyanate compounds described above can be used alone or as a mixture of two or more thereof. Among them, non-yellowing polyfunctional isocyanate compounds without an isocyanate group directly bound with an aromatic ring is preferred in order to prevent the film from yellow discoloration.

The melamine compounds described above include for example, dimethylol melamine, trimethylol melamine, tetramethylol melamine, pentamethylol melamine, hexamethylol melamine, isobutyl ether type melamine, n-butyl ether type melamine, butylated benzoguanamine and the like.

The aminoplast resins described above includes for example, alkyl etherified melamine resin, urea resin, benzoguanamine resin and the like. These aminoplast resins may be used alone, or as a mixture or a cocondensation product of two or more thereof. This alkyl etherified melamine resin is obtained by methylolification of aminotriazine, followed by alkyl etherification with cyclohexanol or alkanol having 1–6 carbon atoms. Representative alkyl etherified melamine resins include a butyl etherified melamine resin, a methyl etherified melamine resin, a methyl butyl mixed melamine resin. Further, sulfonic acid type catalysts for promotion of curing, e.g., para-toluenesulfonic acid and amine salts thereof can be used.

Additionally, the polymer composition may contain an antistatic agent. This antistatic agent is not particularly limited, and for example, available antistatic agents include anionic antistatic agents such as alkyl sulfate, alkyl phosphate and the like; cationic antistatic agents such as quaternary ammonium salts, imidazoline compounds and the like; nonionic antistatic agents such as polyethyleneglycol type, polyoxyethylene sorbitan monostearate ester, ethanolamides and the like; polymeric antistatic agents such as polyacrylic acid and the like; and the like. Among them, cationic antistatic agents are preferred having comparatively strong antistatic effects, which do not impair the stability of dispersion states of the minute inorganic fillers. Moreover, among these cationic antistatic agents, ammonium salts and betaine are particularly preferred, which can more efficiently promote the antistatic property toward the above-described highly hydrophobic binder 4.

Lower limit of the amount of the above-described antistatic agent to be blended (amount calculated on the basis of the solid content to 100 parts by weight of polymer content in the polymer composition) is preferably 0.1 parts by weight, and particularly preferably 0.5 parts by weight. On the other hand, upper limit of the above amount of the antistatic agent is preferably 10 parts by weight, and particularly preferably 5 parts by weight. When the amount of the antistatic agent to be blended is less than the lower limit described above, the aforementioned antistatic effect may not be sufficiently achieved. To the contrary, when the above amount of the antistatic agent to be blended is greater than the upper limit described above, deterioration of the strength of the scratchproof layer 3 due to the added antistatic agent may be raised.

Next, a process for producing the reflection sheet 1 is explained below. The process for producing the reflection sheet 1 generally comprises: (a) a step of preparing a coating liquid for a scratchproof layer through admixing beads 5 in a polymer composition that constitutes a binder 4; and (b) a step of overlaying a scratchproof layer 3 by coating the liquid for the scratchproof layer onto a front face of a substrate sheet 2.

In accordance with the reflection sheet 1, the scratchproof layer 3 has plural protrusions 6 to the front face thereof, therefore, contact in a scattering fashion at plural flexible protrusions 6 is brought toward the optical waveguide plate disposed through overlaying to the front face side. Consequently, possible scratching of the back face of the optical waveguide plate can be markedly reduced, and in addition, sticking with the optical waveguide plate can be prevented. Furthermore, mutual scratching of the reflection sheet(s) can be prevented even though they are in friction each other by rolling or lapping.

Figure 2:
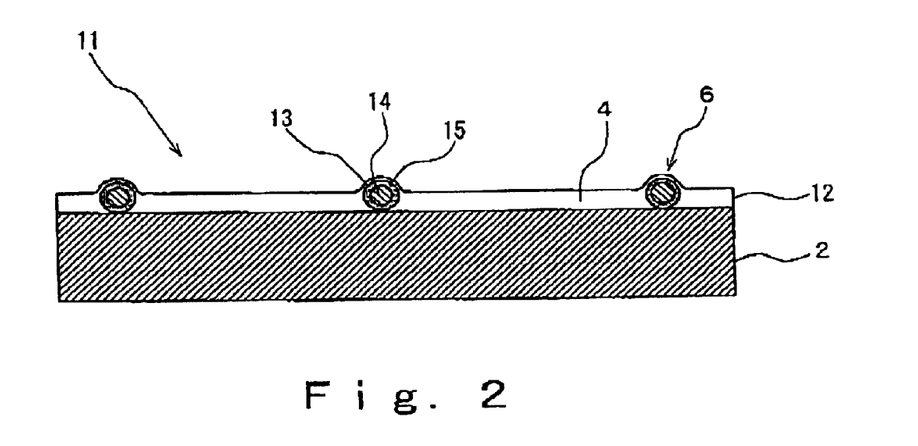
FIG. 2 depicts a schematic cross sectional view illustrating a reflection sheet having different conformation from that in FIG. 1.

A reflection sheet 11 illustrated in FIG. 2 is constituted from a substrate sheet 2, and a scratchproof layer 12 overlaid on the front face of this substrate sheet 2. Because a binder 4 for both of the substrate sheet 2 and the scratchproof layer 12 is similar to that for use in the reflection sheet 1 shown in FIG. 1, explanation thereof is omitted by way of assigning the identical numeric number. Accordingly, the reflection sheet 11 also has the reflection property and concealing property by means of the substrate sheet 2, similarly to the reflection sheet 1.

The scratchproof layer 12 includes a thin-overlaid binder 4, and flexible beads 13 dispersed in the binder 4 spacing apart with each other. On behalf of these beads 13, plural flexible protrusions 6 are formed on the front face of the scratchproof layer 12. Accordingly, the reflection sheet 11 also has remarkable scratchproof property and sticking preventive property toward the optical waveguide plate disposed by overlaying to the front face side, similarly to the reflection sheet 1 as described above.

The beads 13 have a spherical core part 14 made of a silicone rubber, and a silicone resin layer 15 covering over the surface of this spherical core part 14. Silicone resin which is a material for forming this silicone resin layer 15 has a similar molecular structure to that of the above-described silicone rubber, however, degree of polymerization of the organosiloxane bond in a main chain is greater than that of a silicone rubber, and an unsaturated bond is introduced.

In the reflection sheet 11, the outer surface of the beads 13 are covered by a silicone resin layer. Therefore, stability of the beads 13 can be enhanced while keeping the softness of the beads 13. As a result, deterioration and degradation of the scratchproof layer 12 resulting from elution of silicone oil or the like from the spherical core part 14 can be reduced.

Figure 3:
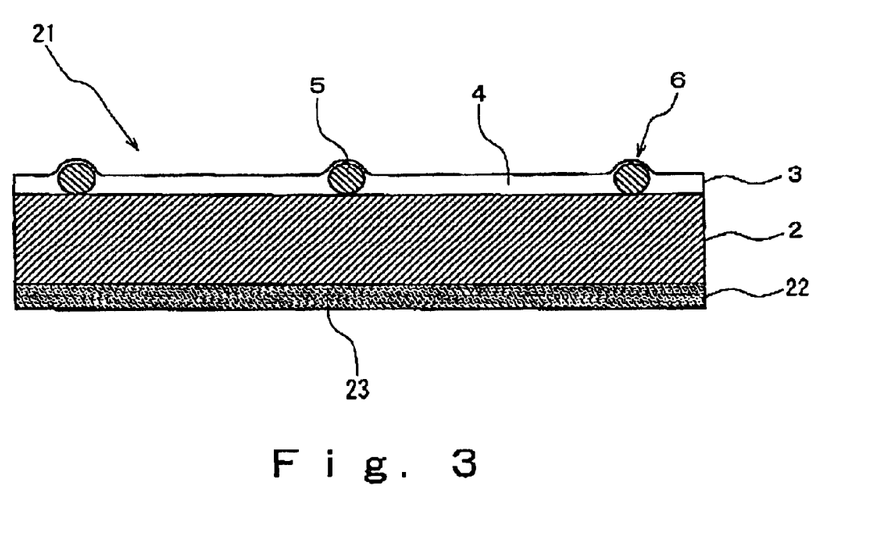
FIG. 3 depicts a schematic cross sectional view illustrating a reflection sheet having different conformation from those in FIG. 1 and FIG. 2.

A reflection sheet 21 illustrated in rig. 3 is constituted from a substrate sheet 2, a scratchproof layer 3 overlaid on the front face of this substrate sheet 2, and a highly concealing layer 22 overlaid on the back face of the substrate sheet layer 2. Because these substrate sheet 2 and scratchproof layer 3 are similar to those for the reflection sheet 1 illustrated in FIG. 1, explanation is omitted by way of assigning the identical numeric number.

The highly concealing layer 22 has eminent concealing property and reflection property, and specifically, it is formed by coating a paint 23, which contains a white pigment, to the back face of the substrate sheet 2. Main component, supplementary component, and auxiliary component (parts other than the pigment) for coating a film in the paint 23 which is used for the highly concealing layer 22 are not particularly limited, but common materials may be used. The white pigment which may be used is similar to that to be included in the substrate sheet 2 described above.

Lower limit of the content (on solid base equivalent) of the whit pigment in the paint 23 is preferably 70% by weight, and particularly preferably 80% by weight. On the other hand, upper limit of the above content is preferably 95% by weight, and particularly preferably 90% by weight. When the content of the white pigment is less than the lower limit described above, the improving effect on the concealing property and reflection property by the highly concealing layer 22 is diminished. To the contrary, when the content of the white pigment is greater than the upper limit described above, difficulties in coating the paint 23 may be raised Lower limit of the amount of the paint 23 to be coated (amount to be coated on solid base equivalent) is 1 g/m$^2$, particularly preferably 5 g/m$^2$, and more preferably 10 g/m$^2$. On the other hand, upper limit of the amount to be coated is 50 g/m$^2$, particularly preferably 45 g/m$^2$, and more preferably 40 g/m$^2$. When the amount of the paint 23 to be coated is less than the lower limit described above, the improving effect on the concealing property and reflection property by the highly concealing layer 22 is diminished. To the contrary, when the amount of the paint 23 to be coated is greater than the upper limit described above, thickness of the highly concealing layer 22 may be increased, which is contrary to demand for thin modeling of a backlight unit, and leads to decrease in strength of the highly concealing layer 22.

Process for producing the reflection sheet 21 essentially comprises: (a) a step of preparing a coating liquid for a scratchproof layer through admixing beads 5 in a polymer composition that constitutes a binder 4; (b) a step of overlaying a scratchproof layer 3 by coating this coating liquid onto a front face of a substrate sheet 2 followed by drying; (c) a step of preparing a paint 23 which contains a white pigment; and (d) and a step of overlaying a highly concealing layer 22 by coating the paint 23 onto the back face of the substrate sheet 23.

In accordance with the reflection sheet 21, similarly to the reflection sheet 1 described above, reflection property and concealing property can be achieved by employing a substrate sheet 2. In addition, eminent scratchproof property and sticking preventive property are provided by way of the scratchproof layer 3. Furthermore, the highly concealing layer 22 that is disposed on the back face of the substrate sheet 2 can markedly improve the reflection property and concealing property.

Figure 4:
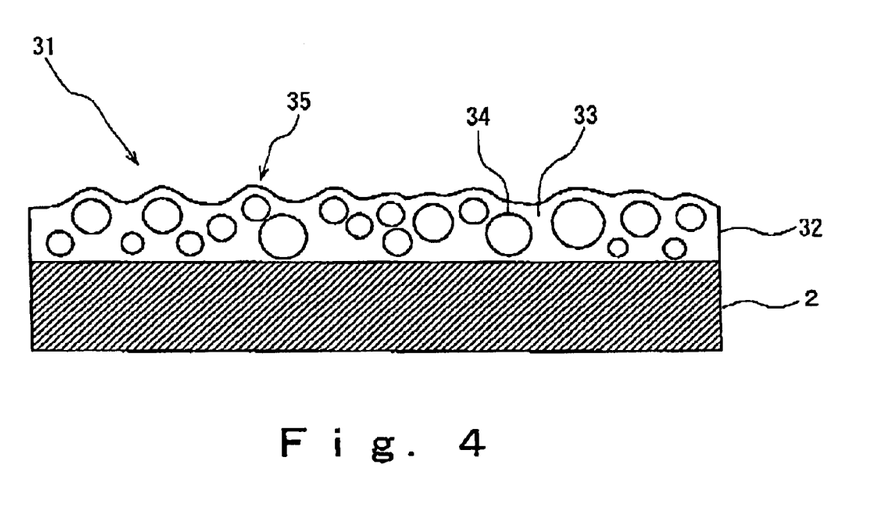
FIG. 4 depicts a schematic cross sectional view illustrating a reflection sheet having different conformation from those in FIG. 1, FIG. 2 and FIG. 3.

A reflection sheet 31 illustrated in FIG. 4 includes a substrate sheet 2 and a scratchproof layer 32 overlaid on the front face of this substrate sheet 2. This substrate sheet 2 is similar to that in the reflection sheet 1 in FIG: 1, however, the structure of the scratchproof layer 32 is different.

This scratchproof layer 32 includes a substrate polymer 33, and bubbles 34 dispersed in the substrate polymer 33. By dispersing the bubbles 34, plural protrusions 35 are formed in a substantially uniform manner on its front face. The protrusions 35 are resilient and flexible on behalf of the indwelling bubbles 34, and are smoothly curved. Therefore, the reflection sheet 31 is brought into contact in a scattering fashion at plural flexible protrusions 35 with the optical waveguide plate disposed to the front face side of the reflection sheet 31 in a backlight unit. Consequently, possible scratching of the back face of the optical waveguide plate can be reduced.

Thickness and surface roughness (Ra) of this scratchproof layer 32 are similar to those for the scratchproof layer 3 of the reflection sheet 1 illustrated in FIG. 1. In addition, materials constituting the substrate polymer 33 which may be used are similar to those materials for use in the binder 4 of the scratchproof layer 3 of the above-described reflection sheet 1. However, a thermosetting resin such as urea resin, melamine resin, phenol resin, epoxy resin, unsaturated polyester resin, alkyd resin, urethane resin may be suitably used, which can be cured concurrently with the expansion step by a foaming agent for the formation of the bubbles 34.

The bubbles 34 are minute parts containing some kind of gas, existing in the substrate polymer 33. Shape of the bubbles is not particularly limited, and allowable shapes include a variety of shapes such as spherical, granular, polyhedral, crenated, random shaped, spindle and the like. The shape of the bubbles 34 is preferably a spherical closed cell in terms of facility in forming the protrusions 35, and of promotion of concealing property resulting from manifest light diffusion property. In addition, the bubbles 34 exist inside of the substrate polymer 33 in principle, however, open cells that are open to the surface of the substrate polymer 33 may be present, which open cells enhance the light diffusion property.

The gas included in the bubbles 34 is determined in dependence upon the process for forming the bubbles 34 without any particular limitation. For example, when a foaming agent is used as described below, air, nitrogen gas, carbon dioxide, ammonia gas or the like may be filled up in dependence on the type of the foaming agent.

Lower limit of the average diameter of the bubbles 34 is preferably 0.5 $\mu$m, and particularly preferably 1 $\mu$m, and more preferably 5 $\mu$m. Upper limit of the average diameter thereof is preferably 50 $\mu$m, and particularly preferably 40 $\mu$m, and more preferably 30 $\mu$m. When the average diameter of the bubbles 34 is less than the lower limit described above, formation of the protrusions 35 may be difficult, and thus it becomes impossible to have the surface roughness (Ra) of the scratchproof layer 32 fall within the range described above. To the contrary, when the average diameter thereof is greater than the upper limit described above, strength of the scratchproof layer 32 may be deteriorated.

Lower limit of the volume ratio of the bubbles 34 to the substrate polymer 33 is preferably 1 vol %, particularly preferably 10 vol %, and more preferably 20 vol %. Upper limit of the volume ratio thereof is preferably 80 vol %, particularly preferably 70 vol %, and more preferably 60 vol %. When the volume ratio of the bubbles 34 is less than the lower limit described above, it becomes impossible to have the surface roughness (Ra) of the scratchproof layer 32 by way of the protrusions 35 tall within the range described above. In addition, an effect to improve the concealing property in conjunction with the light diffusion property is also deteriorated. To the contrary, when the volume ratio of the bubbles 34 is greater than the upper limit described above, strength and durability of the scratchproof layer 32 may be deteriorated.

Process for producing the reflection sheet 31 essentially comprises: a step of preparing a coating liquid for a scratchproof layer 32 through adding and kneading a foaming agent into a resin composition, of which principal polymer being a thermosetting resin, which constitutes the substrate polymer 33; a step of coating in which this coating liquid is coated onto a front face of the substrate sheet 2; and a step of overlaying a scratchproof layer 32 having bubbles 34 dispersed in the substrate polymer 33 by expansion using the foaming agent concomitantly with heat curing of the substrate polymer 33 though heating.

In accordance with the reflection sheet 31, possible scratching of the back face of the optical waveguide plate, which is disposed to the front face side, can be prevented by means of the scratchproof layer 32 on the front face of the substrate sheet 2. Further, in the reflection sheet 31, reflection property toward the front face side, as well as the concealing property can be enhanced by plural protrusions 35 formed on the front face of the scratchproof layer 32 Moreover, enhanced light diffusion property can be achieved in the reflection sheet 31 by refraction and irregular reflection on the interface of the dispersed bubbles 34, and thus the concealing property can be enhanced also in this respect.

Accordingly, in a backlight unit which is an edge light type, by overlaying the reflection sheet 1, 11 or 21 on the back face of the optical waveguide plate, occurrence of lack in uniformity of the brightness resulting from scratches on the back face of the optical waveguide plate can be prevented because the reflection sheet 1, 11 or 21 exhibits a scratchproof property as described above. In addition, assembly of the backlight unit is facilitated. In particular, when a reflection sheet 21 is used which is provided with a highly concealing layer 22 to the back face side thereof, loss of rays of light, which are radiated from the back face side, can be reduced on behalf of eminent concealing property and reflection property of the highly concealing layer 22, and brightness can be thereby improved. Additionally, frames and the like provided to the back face side can be prevented from becoming visible through the display, and prevention of the occurrence of lack in uniformity of the brightness can be promoted.

What is claimed is:

1. A reflection sheet for a backlight unit which is provided on a rear face of an optical waveguide plate and reduces loss of rays of light comprising:
    a substrate sheet made of a white synthetic resin, and
    a scratchproof layer overlaid on and in contact with a front side of the substrate sheet facing the optical waveguide plate, a front face of said scratchproof layer constituting a front face of the reflection sheet,
    said scratchproof layer comprising a binder and beads made of a flexible elastomer material dispersed in said binder, wherein a plurality of flexible protrusions are formed in a substantially uniform manner by means of said beads on the front face of said scratchproof layer and wherein flexible nolvurethane or a silicone rubber is used as the flexible elastomer material that constitutes said beads.

2. The reflection sheet according to claim 1 wherein surface roughness (Ra) of said scratchproof layer ranges from 5 $\mu$m to 20 $\mu$m.

3. The reflection sheet according to claim 1 wherein glass transition temperature of the flexible elastorner material that constitutes said beads ranges from −100° C. to 30° C.

4. The reflection sheet according to claim 1 wherein said beads comprise a spherical core part made of a silicone rubber, and a silicone resin layer covering a surface of said spherical core part.

5. The reflection sheet according to claim 1 wherein an average particle diameter of said beads is from 1 $\mu$m to 40 $\mu$m.

6. The reflection sheet according to claim 1 wherein a pencil hardness of said binder is from 6B to B.

7. The reflection sheet according to claim 1 wherein said binder is formed from a polymer composition containing polyester polyol.

8. The reflection sheet according to claim 7 wherein polyisocyanate is contained as a curing agent in said polymer composition.

9. The reflection sheet according to claim 1 wherein the amount of said beads to be blended per 100 parts by weight of polymer content of said binder is from 0.1 parts by weight to 100 parts by weight.

10. The reflection sheet according to claim 1 further comprising a highly concealing layer which is overlaid on a rear side of said substrate sheet, said highly concealing layer being formed by coating a paint which contains a white pigment.

11. A backlight unit for use in a liquid crystal display device comprising:
    a lamp in a linear shape,
    an optical waveguide plate which is provided so that it lays along the lamp, and which guides rays of light emitted from the lamp to the front face side,
    one or more optical sheet(s) which are provided to the front face side of said optical waveguide plate, and which diffuse rays of light that exit from said optical waveguide plate in a substantially uniform manner and refract them to a direction of the normal line, and
    a reflection sheet which is provided to the back face side of said optical waveguide plate, and which reduces loss of rays of light,
        said reflection sheet comprising a substrate sheet made of a white synthetic resin, and a scratchproof layer overlaid on and in contact with a front side of the substrate sheet facing said optical waveguide plate, a front face of said scratchproof layer constituting a front face of the reflection sheet,
        said scratchproof layer comprising a binder and beads made of a flexible elastomer material dispersed in said binder, wherein a plurality of flexible protrusions are formed in a substantially uniform manner by means of said beads on the front face of said scratchproof layer and wherein flexible polyurethane or a silicone rubber is used as the flexible elastomer material that constitutes said beads.

12. The reflection sheet according to claim 1, wherein said substrate sheet is made of a different material than said scratchproof layer.

13. The backlight unit according to claim 11, wherein said substrate sheet is made of a different material than said scratchproof layer.

* * * * *